United States Patent
High et al.

(10) Patent No.: US 10,269,255 B2
(45) Date of Patent: Apr. 23, 2019

(54) UNMANNED AIRCRAFT SYSTEMS AND METHODS

(71) Applicant: Walmart Apollo, LLC, Bentonville, AR (US)

(72) Inventors: Donald R. High, Noel, MO (US); David C. Winkle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 156 days.

(21) Appl. No.: 15/460,578

(22) Filed: Mar. 16, 2017

(65) Prior Publication Data

US 2017/0270803 A1     Sep. 21, 2017

Related U.S. Application Data

(60) Provisional application No. 62/310,160, filed on Mar. 18, 2016.

(51) Int. Cl.
| | | |
|---|---|---|
| *B60L 3/00* | (2006.01) | |
| *G08G 5/00* | (2006.01) | |
| *B64C 39/02* | (2006.01) | |
| *G05D 1/00* | (2006.01) | |
| *G05D 1/02* | (2006.01) | |
| *G05D 1/10* | (2006.01) | |

(52) U.S. Cl.
CPC ............ *G08G 5/006* (2013.01); *B64C 39/02* (2013.01); *B64C 39/024* (2013.01); *G05D 1/0088* (2013.01); *G05D 1/0202* (2013.01); *G05D 1/101* (2013.01); *G08G 5/0039* (2013.01); *G08G 5/0069* (2013.01); *B64C 2201/128* (2013.01); *B64C 2201/141* (2013.01)

(58) Field of Classification Search
CPC ........ G08G 5/006; B64C 39/02; B64C 39/024
See application file for complete search history.

(56) References Cited

U.S. PATENT DOCUMENTS

| | | |
|---|---|---|
| 7,347,361 B2 | 3/2008 | Lovett |
| 7,543,741 B2 | 6/2009 | Lovett |
| 7,729,817 B2 | 6/2010 | Duranti |

(Continued)

OTHER PUBLICATIONS

"Hover—Drone & UAV Pilot app!—Androids Apps on Google Play"; https://play.google.com/store/apps/details?id=com.analyticadevelopment.android.hover&hl=en; Retrieved Dec. 17, 2015; 3 pages.

(Continued)

*Primary Examiner* — Adam M Alharbi
(74) *Attorney, Agent, or Firm* — Fitch, Even, Tabin & Flannery LLP

(57) ABSTRACT

Some embodiments provide a system to identify geographic zones into which unmanned aircraft systems (UAS) are inhibited from flying. In some instances, the system detects, while the UAS is in flight and traveling along a flight path to a delivery location where the UAS is scheduled to deliver a package, a no fly zone (NFZ) into which the UAS is to avoid flying; obtains a revised flight path to the delivery location that includes a detour route around the no fly zone; directs the motor controller to control the motors to implement the revised flight path; and detects when the UAS is at a threshold distance from the delivery location and initiate delivery of the package.

16 Claims, 3 Drawing Sheets

(56) References Cited

U.S. PATENT DOCUMENTS

| | | |
|---|---|---|
| 7,737,878 B2 | 6/2010 | van Tooren |
| 7,810,720 B2 | 10/2010 | Lovett |
| 9,087,451 B1 | 7/2015 | Jarrell |
| 9,550,577 B1 | 1/2017 | Beckman |
| 9,573,684 B2 | 2/2017 | Kimchi |
| 2010/0084513 A1 | 4/2010 | Gariepy |
| 2011/0208373 A1 | 8/2011 | Lees |
| 2011/0264311 A1 | 10/2011 | Lee |
| 2012/0280798 A1 | 11/2012 | Li |
| 2014/0018979 A1 | 1/2014 | Goossen |
| 2015/0120094 A1 | 4/2015 | Kimchi |
| 2015/0248797 A1 | 9/2015 | Duggan |
| 2015/0254988 A1 | 9/2015 | Wang |
| 2015/0277440 A1 | 10/2015 | Kimchi |
| 2015/0336668 A1* | 11/2015 | Pasko ................... B64C 39/024 701/2 |
| 2015/0339933 A1 | 11/2015 | Batla |
| 2016/0012730 A1 | 1/2016 | Jarrell |
| 2016/0196755 A1 | 7/2016 | Navot |
| 2016/0247404 A1* | 8/2016 | Srivastava ............. G01C 21/20 |
| 2016/0257401 A1 | 9/2016 | Buchmueller |
| 2017/0110017 A1 | 4/2017 | Kimchi |
| 2017/0236428 A1* | 8/2017 | High ..................... B64C 39/024 701/120 |

OTHER PUBLICATIONS

Newman, Hay Lily; "Future Tense: Here's How to Set Up a No-Fly Drone Zone Over Your House"; http://www.slate.com/blogs/future_tense/2015/02/10/noflyzone_org_lets_you_geofence_the_area_over_your_house_for_drones_to_avoid.html; Published Feb. 10, 2015; 14 pages.

PCT; App. No. PCT/US2017/022234; International Search Report and Written Opinion dated May 24, 2017.

* cited by examiner

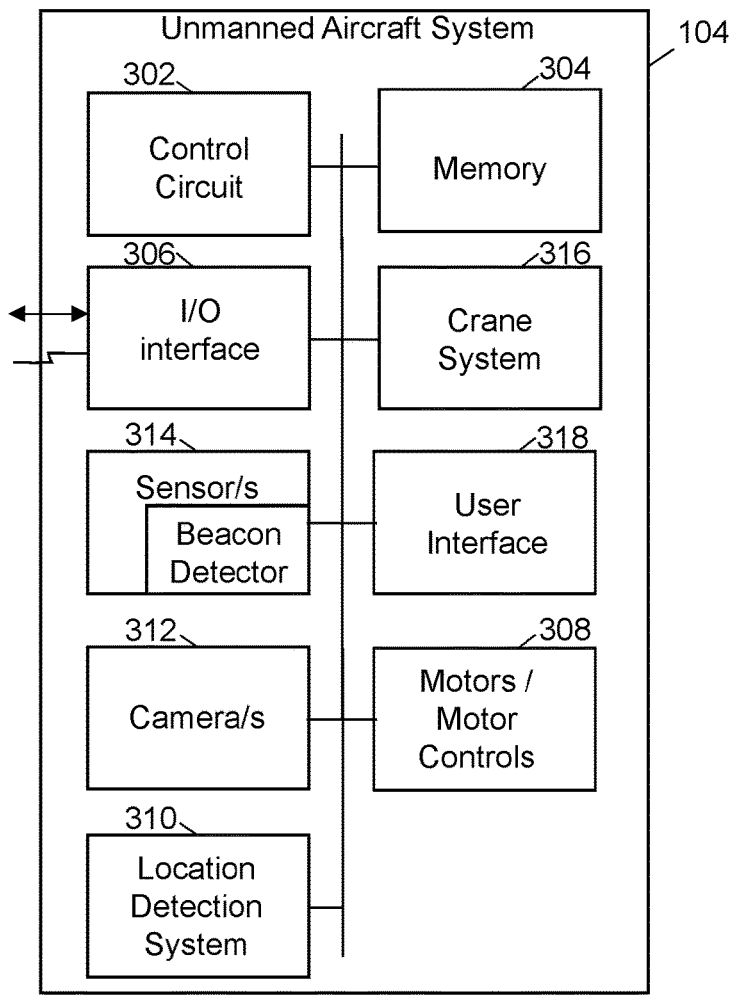
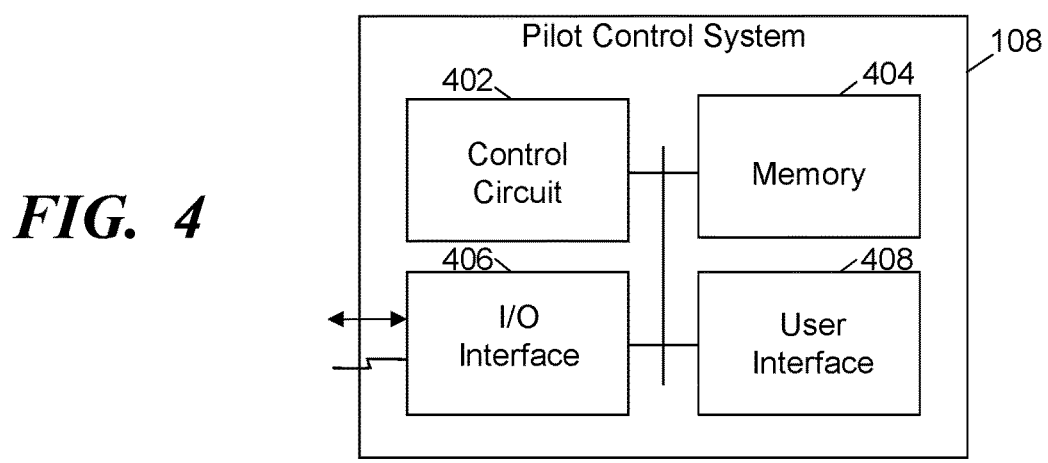
FIG. 3
FIG. 4 ns and Methods

UNMANNED AIRCRAFT SYSTEMS AND METHODS

CROSS-REFERENCE TO RELATED APPLICATION

This application claims the benefit of U.S. Provisional Application No. 62/310,160, filed Mar. 18, 2016, which is incorporated herein by reference in its entirety.

TECHNICAL FIELD

This invention relates generally to unmanned aircraft systems (UAS).

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining to unmanned aircraft systems (UAS). This description includes drawings, wherein:

FIG. 3 illustrates a simplified block diagram of an exemplary UAS, in accordance with some embodiments.

FIG. 4 illustrates a simplified block diagram of an exemplary pilot control system, in accordance with some embodiments.

Figure 1:
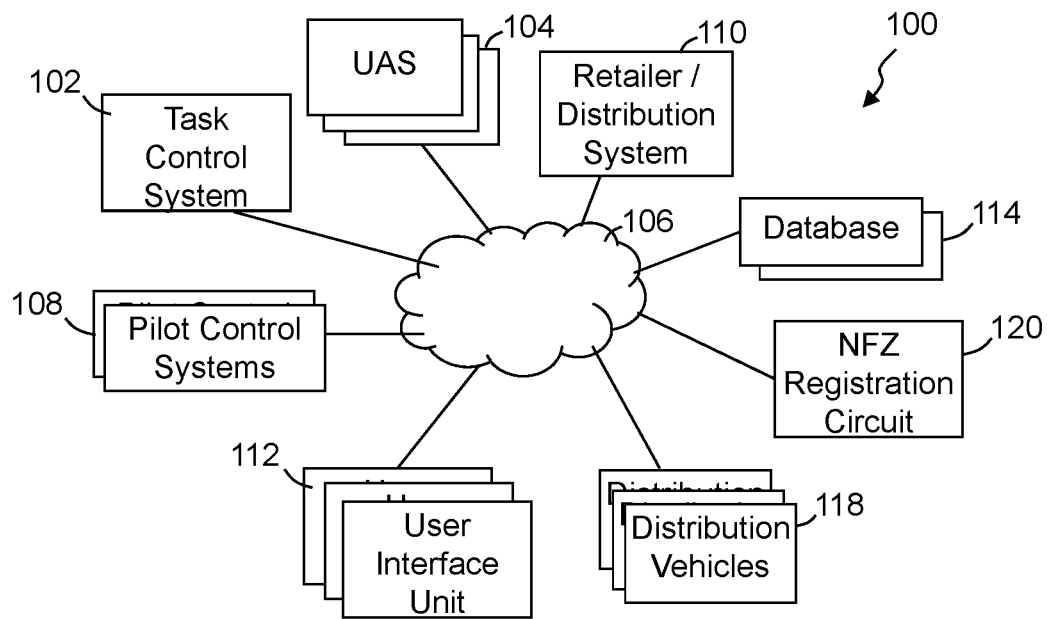
FIG. 1 illustrates a simplified block diagram of an exemplary unmanned aircraft system (UAS) control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to deliver products to customers' vehicles using unmanned aircraft systems (UAS). In some embodiments, systems identify geographic zones and/or areas into and/or through which UASs should not fly. These geographic zones may be generally referred to as "no fly zones" (NFZ). Such no fly zones may be governmentally defined (e.g., areas at and around airports, areas above and around some government buildings, military areas, and other such areas), and may be established by a company, a person, emergency services agency, other such entities, or combinations of two or more of such entities. As such, some embodiments identify geographic zones into which UASs should be and/or are inhibited from flying. Some systems include a control circuit that is configured, in executes instructions stored in memory accessible by the control circuit, to detect a no fly zone into which the UAS is to avoid flying. In some applications, the no fly zone is detected while a UAS is in flight and traveling along a flight path to a predefined location (e.g., a predefined package delivery location where the UAS is scheduled to deliver a package). A revised flight path to the delivery location can be obtained. The revised flight path to the delivery location typically includes a detour route around the no fly zone. The control circuit can direct a motor controller to control motors of a UAS to implement the revised flight path. Accordingly, the UAS is capable of implementing the revised flight path. Some embodiments further detect when the UAS is at a threshold distance from the delivery location and initiate delivery of the package.

FIG. 1 illustrates a simplified block diagram of an exemplary UAS control system 100, in accordance with some embodiments. The exemplary UAS control system 100 includes one or more task control systems 102 and multiple unmanned aircraft systems (UAS) 104. The UASs are in communication over one or more distributed communication and/or computer networks 106 with the task control system 102. The task control system controls the distribution and/or provides flight path information to the UASs in implementing one or more tasks, such as but not limited to delivering packages, capturing video, obtaining inspection data, and other such tasks. It is noted that the below description generally describes a task of performing deliveries of products, however, the system is not limited to performing deliveries and instead can be applied to numerous other tasks.

In some embodiments, one or more pilot control systems 108 are included that allow one or more remote pilots to each provide flight commands to be implemented by a UAS. The flight commands can be a single simple command (e.g., change course), a series of commands, or allowing the remote pilot to take over full control of a UAS for at least a period of time. One or more retailer and/or product distribution center systems 110 may be accessible over the one or more distributed networks 106 by retailer workers, customers, third party vendors, or other entities using user interface units 112 and/or other such devices. For example, customers can access a retailer system and purchase one or more products. Further, the customers may elect to have the purchased products delivered.

The UAS control system 100 can, in some applications, further include and/or be accessible by multiple user interface units 112, each associated with at least one customer. The user interface units can be substantially any relevant device enabling customers to access, communicate with and/or interact with the UAS control system and/or the retailer system 110. For example, the user interface unit may be a computer, laptop, smart phones, tablets, and other such devices, that allows a person to interact with the UAS control system and/or retailer system. The user interface units can communicate via the communication network 106 with the retailer system 110, and in some applications can communicate with the task control system 102 and/or a UAS. Some embodiments further utilize one or more distribution and/or launch vehicles 118 that transport one or more UASs, and when relevant packages to be delivered by those UASs, to one or more strategic launch locations from which one or more UASs can be launched to implement the intended task (e.g., unmanned aerial delivery, video capture, establish wireless network, etc.). In some implementations, the UAS control system 100 may further include a no fly zone registration circuit and/or system 120 that allows individuals, companies and/or other such entities to register areas, property, buildings and the like as no fly zones.

The task control system 102 is configured to coordinate the tasks performed by the UASs 104, such as coordinate the delivery of packages and/or products ordered by customers. This can include determining and/or providing delivery scheduling, flight schedules, flight route plans, alternate route information, identification of some no fly zones, and/or other such functions. In some applications, product orders are received from the retailer systems 110. The retailer systems may include Internet market retailer sources, in-store order systems, and/or other such sources. Further, the product orders may designate and/or request that one or more products of the order are to be delivered by an UAS. Additionally or alternatively, customers may register with a retail entity that maintains a customer profile or record, and during the registration the customer may have authorized and/or requested products be delivered using the UAS. In some embodiments, the UAS control system is implemented with and/or associated with a single retail entity that provides product delivery services to customers using the UASs. In other implementations, the UAS control system 100 may be implemented by a service with which a retail entity can contract. For example, the UAS control system may be implemented as part of a package delivery service.

Based on received orders and/or other tasks scheduled to be performed by one or more UASs, the task control system can schedule deliveries (and/or tasks) and provide relevant routing and/or flight path information to a corresponding one of the UASs 104. The determined flight path is determined based on a designated delivery location received from the customer and/or a task location where the UAS is to perform or assist in performing the task. In some embodiments, the customers may use their portable user interface units 112 to specify a delivery location. Based on the specified delivery location, the task control system can determine a scheduled delivery based on one or more factors, along with a flight path or route that an UAS is instructed to travel while carrying the one or more packages for delivery. Accordingly, some embodiments enable an UAS to be able to deliver a payload to a determined delivery location and/or perform other tasks at predefined task locations.

While in flight, the UAS and/or the task control system (and in some instances one or more pilots through the pilot control system) processes sensor data in attempts to identify no fly zones. Typically, the UAS includes multiple sensors that can be used to capture information that can be used to detect a no fly zone. Other sensor data may be received from other devices, such as but not limited to user interface units 112, fixed cameras, other UASs, and/or other such devices. Based on the sensor data, a no fly zone may be detected. The detected no fly zone may be a no fly zone that the task control system is already aware of, and that the task control system took into consideration in determining a flight path. Many no fly zones, however, are going to be unknown to the task control system. For example, a no fly zone may be specified by an entity or individual that was not previously specified (e.g., a person registers their property or home as a no fly zone, emergency vehicles may temporarily be operating in an area and is temporarily designated as a no fly zone, a person or entity may post a flag or other marker, activate a broadcast (e.g., radio frequency, Wi-Fi, optical, etc.) that designates a no fly zone, and/or other such scenarios). Accordingly, the UAS may detect a no fly zone that extends across a flight path provided to the task control system. Using the sensor data a no fly zone, which may previously have been unknown, may be detected and the UAS can be controlled to avoid flying into and/or across the no fly zone. The recognition of a no fly zone can be based on image processing, wireless communication, RFID detection, bar code detection, text capture, pattern recognition, beacon detection, other such recognition methods, or combination of two or more of such recognition methods. For example, one or more images and/or video of an area along a flight path may be captured by one or more cameras of a UAS while in flight. Image and/or video processing can be performed to detect a flag, pattern or other such distinguishable indicator. Similarly, in some instances, a beacon transmitter may transmit a predefined wireless signal that can be detected by a UAS while in range, and typically while in flight.

Figure 2:
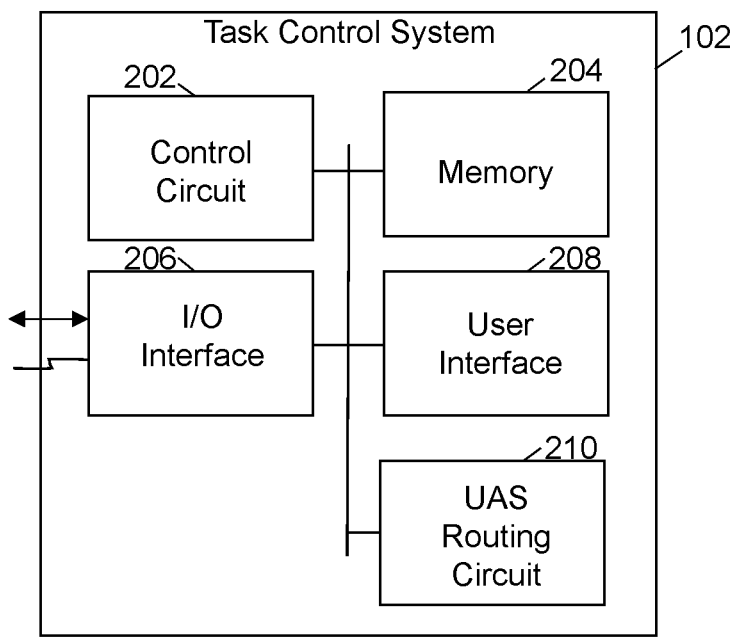
FIG. 2 illustrates a simplified block diagram of an exemplary task control system, in accordance with some embodiments.

FIG. 2 illustrates a simplified block diagram of an exemplary task control system 102, in accordance with some embodiments. The task control system includes one or more task system control circuits 202, memory 204, and input/output (I/O) interfaces and/or devices 206. Some embodiments further include one or more user interfaces 208. Further, the task control system may include and/or access a UAS routing circuit 210. The task system control circuit 202 typically comprises one or more processors and/or microprocessors. The memory 204 stores the operational code or set of instructions that is executed by the task system control circuit 202 and/or processor to implement the functionality of the task control system 102. In some embodiments, the memory 204 may also store some or all of particular data that may be needed to schedule deliveries, determine delivery locations, confirm delivery locations, determine flight paths, cause flight paths and/or flight instructions to be communicated to the UAS 104, and make any of the associations, determinations, measurements and/or communications described herein. Such data may be pre-stored in the memory, received from an external source (e.g., retailer distribution system 110, UASs 104, pilot control system 108, user interface units 112, etc.), be determined, and/or communicated to the task control system. The UAS routing circuit 210 is configured to obtain and/or determine flight paths (e.g., between UAS launch locations and task locations, between different task locations, between task locations and recovery locations where a UAS is recovered, etc.). Typically, the UAS routing circuit takes into consideration known no fly zones in determining the flight paths.

It is understood that the task system control circuit 202 and/or processor may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the task control system 102; however, the memory 204 can be internal, external or a combination of internal and external memory. Additionally, the task control system typically includes a power supply (not shown) that is typically rechargeable, and/or it may receive power from an external source. While FIG. 2 illustrates the various components being coupled together via a bus, it is understood that the various components may actually be coupled to the task system control circuit 202 and/or one or more other components directly.

Generally, the task system control circuit 202 and/or electronic components of the task control system 102 can comprise fixed-purpose hard-wired platforms or can comprise a partially or wholly programmable platform. These architectural options are well known and understood in the art and require no further description here. The task control system and/or task system control circuit can be configured (for example, by using corresponding programming as will be well understood by those skilled in the art) to carry out one or more of the steps, actions, and/or functions described herein. In some implementations, the task system control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the task control system 102 to external components, such as the UASs 104, retailer system 110, pilot control systems 108, user interface units 112, databases 114, and other such devices or systems. Typically, the I/O interface 206 provides wired and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 208 may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to product orders, product information, flight path mapping, flight path information, no fly zone location information, no fly zone mapping, UAS parameter data, customer information, images, video, communication information (e.g., text messages, emails, etc.), status information, mapping information, operating status information, notifications, errors, conditions, and/or other such information. Similarly, the user interface 208 in some embodiments may include audio systems that can receive audio commands or requests verbally issued by a worker, and/or output audio content, alerts and the like.

FIG. 3 illustrates a simplified block diagram of an exemplary UAS 104, in accordance with some embodiments. The UAS includes one or more UAS control circuits 302, memory 304, input/output (I/O) interfaces and/or devices 306, motors and motor control circuitry 308, location detection systems 310, and one or more cameras 312. Some embodiments further include one or more sensors 314, a crane system 316, a user interface 318, and/or other such systems. The UAS control circuit 302 comprises one or more processors and/or microprocessors and couples with the memory 304 that stores operational codes or sets of instructions that are executed by the UAS control circuit 302 and/or processor to implement the functionality of the UAS 104. In some embodiments, the memory 304 may also store some or all of particular data that may be needed to navigate to task locations, detect no fly zones, determine and/or implement a detour route, determine and/or implement a revised flight path, detect and/or determine one or more boundaries of a no fly zone, deliver one or more products, and/or other such functions. It is understood that the UAS control circuit 302 may be implemented as one or more processor devices as are well known in the art. Similarly, the memory 304 may be implemented as one or more memory devices as are well known in the art, such as those described above. Further, the memory 304 is shown as internal to the UAS 104; however, the memory 304 can be internal, external and wirelessly accessible, or a combination of internal and external memory. Additionally, the UAS typically includes a power supply (not shown) that is typically rechargeable, and/or it may receive power from an external source. While FIG. 3 illustrates the various components being coupled together via a bus, it is understood that the various components may actually be coupled to the UAS control circuit 302 and/or one or more other components directly.

The UAS control circuit 302 and/or electronic components of the UAS 104 can comprise fixed-purpose hard-wired platforms or can comprise a partially or wholly programmable platform. These architectural options are well known and understood in the art and require no further description here. The UAS and/or UAS control circuit can be configured (for example, by using corresponding programming as will be well understood by those skilled in the art) to carry out one or more of the steps, actions, and/or functions described herein. In some implementations, the UAS control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the UAS 104 to external components, such as task control system 102, the retailer system 110, pilot control system 108, in some instances one or more user interface units 112, and other such devices or systems. Typically, the I/O interface 306 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The one or more motor controllers of the UAS couple with motors that each drive a propeller to control flight of the UAS. The location detection system 310 obtains location information to determine a current location of and track the location and movements of the UAS. The UAS control circuit 302 utilizes the location information in controlling the movements of the UAS. In some instances, the location detection system may include a global positioning detection system and/or system that received global positioning coordinate information, Wi-Fi signal triangulation and/or evaluation system, cellular tower triangulation system, beacon detection, and/or other such location detection system. Further, the location detection system may use information provided by one or more sensors 314 in determining and/or tracking location information. The sensors can include substantially any relevant sensor such as, but not limited to, one or more inertial sensors, accelerometers, altimeters, gyroscopes, compass, distance measurement systems (e.g., ultrasound, laser, etc.), and/or other such sensor information. Other sensors 314 may be included that may or may not be used for location detection, such as but not limited to wireless signal strength sensor, weather sensors, magnetic radiation detection sensors, movement detector (e.g., detecting movement within a threshold distance of the delivery location), and the like.

Typically, the sensors of the UAS 104 include one or more cameras 312 that capture images and/or video that can be evaluated by the UAS control circuit 302 of the UAS and/or communicated to the task control system 102 for processing. In operation, the UAS control circuit 302 can activate one or more of the cameras 312, which may be in response to a command from the task control system, in response to a pilot command received from the pilot control system, the UAS control circuit activates one or more cameras based on a predefined delivery sequence (e.g., in response to activation and prior to taking off, after reaching a threshold height after take-off, when within a threshold distance of the delivery location activate a camera to capture images and/or video, when hovering over the delivery site, while lowering the UAS, while lowering the package by a crane system 316, and the like), and the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. In some embodiments, the one or more cameras provide omnidirectional imaging and/or video capabilities. As introduced above, in some embodiments one or more pictures and/or video captured by the camera/s 312 of the UAS can be evaluated in detecting and/or identifying one or more no fly zones that a UAS is to avoid flying into. Further, in some applications video can be communicated to the pilot control system to allow a pilot to see the no fly zone indicator and/or evaluate sensor data to determine whether a no fly zone is detected.

In some implementations, a UAS 104 may include a crane system 316 that allows a package being delivered to be lowered to a delivery site while the UAS hovers over the delivery site, and typically hovers at or above a threshold height above the delivery site. The crane system and/or a package release system may in some embodiments be implemented in accordance with or similar to the crane systems, and/or release system described in U.S. Provisional Application No. 62/222,572, for Nathan G. Jones et al., filed Sep. 23, 2015, and entitled SYSTEMS AND METHODS OF DELIVERING PRODUCTS WITH UNMANNED DELIVERY AIRCRAFTS, and U.S. Provisional Application No. 62/222,575, for Nathan G. Jones, filed Sep. 23, 2015, and entitled PACKAGE RELEASE SYSTEM FOR USE IN DELIVERY PACKAGES, AND METHODS OF DELIVERING PACKAGES, which are incorporated herein by reference in their entirety.

In some implementations, the UAS may include one or more user interfaces 318 that can be used for user input and/or output display. For example, the user interface 318 may include any known input devices, such one or more buttons, knobs, selectors, switches, keys, touch input surfaces, audio input, and/or displays, etc. Additionally, the user interface 318 includes one or more output display devices, such as lights, visual indicators, display screens, etc. to convey information to a user. Similarly, the user interface 318 in some embodiments may include audio systems that can receive audio commands or requests verbally issued by a worker, and/or output audio content, alerts and the like.

FIG. 4 illustrates a simplified block diagram of an exemplary pilot control system 108, in accordance with some embodiments. The pilot control system includes one or more pilot system control circuits 402, memory 404, input/output (I/O) interfaces and/or devices 406, user interfaces 408. The pilot system control circuit 402 typically comprises one or more processors and/or microprocessors, and couples with the memory 404 to access operational code or set of instructions that are executed by the pilot system control circuit 402 to implement the functionality of the pilot control system 108. In some embodiments, the memory 404 may also store some or all of particular data that may be needed to remotely control the UASs 104, and make any of the associations, determinations, measurements and/or communications described herein. It is understood that the pilot system control circuit 402 and/or memory 404 may be implemented as one or more processor devices and memory as are well known in the art, such as those described above. Further, the memory 404 is shown as internal to the pilot control system 108; however, the memory 404 can be internal, external or a combination of internal and external memory. While FIG. 4 illustrates the various components being coupled together via a bus, it is understood that the various components may actually be coupled to the pilot system control circuit 402 and/or one or more other components directly. In some implementations, the pilot system control circuit and the memory 404 may be integrated together, such as in a microcontroller, application specification integrated circuit, field programmable gate array or other such device, or may be separate devices coupled together.

The I/O interface 406 allows wired and/or wireless communication coupling of the pilot control system 108 to external components, such as the UAS 104, task control system 102, retailer system 110, databases 114, and other such devices or systems. Typically, the I/O interface 406 provides at least wireless communication (e.g., cellular, satellite, Wi-Fi, Bluetooth, RF, and/or other such wireless communication), and in some instances may include any known wired and/or wireless interfacing device, circuit and/or connecting device, such as but not limited to one or more transmitter, receiver, transceiver, etc. The user interface 408 is used for user input and/or output display. For example, the user interface 408 may include any known input devices, such one or more buttons, knobs, selectors, switches, keys, touch input surfaces, joysticks, dials, audio input, and/or displays, etc. Additionally, the user interface 408 further includes one or more output display devices, such as lights, visual indicators, display screens, etc. to convey information to a user/worker, such as but not limited to sensor data, video data, images, no fly zone detection data, flight path information and/or mapping, revised flight path information and/or mapping, detour route information and/ or mapping, no fly zone parameters (e.g., size, dimensions, orientation, etc.), no fly zone mapping, delivery location parameters and/or statistics, product information, flight path mapping, flight path information, UAS parameter data, customer information, communication information (e.g., text messages, emails, etc.), status information, mapping information, operating status information, notifications, errors, conditions, and/or other such information. Similarly, the user interface 408 in some embodiments may include audio systems that can receive audio commands or requests verbally issued, and/or output audio content, alerts and the like.

Further, some embodiments provide a bank of pilot control systems 108 with one or more pilots manning the pilot control systems while UASs are scheduled to and/or while UASs are performing tasks. Through the pilot control system a pilot can remotely take over at least some of the controls of a UAS. The pilot system control circuit can receive a notification that pilot assistance is requested (e.g., in response to detecting a no fly zone, in response to a UAS requesting confirmation of rerouting, based on a UAS being unable to determine one or more boundaries of a no fly zone, based on error conditions, while the UAS is within a threshold pilot control distance of the task location (e.g., delivery location), and/or other such conditions. Remote control over at least some of the controls of the UAS can be established through the I/O interface 406 (e.g., transceiver). As such, commands can be received through the user interface 408 from a pilot, and be communicated to the UAS to implement the commands such that the pilot controls at least some aspects of the UAS and/or takes over total control of the UAS. Typically, the pilot can take over control during any time the UAS is in operation (e.g., the UAS is preparing for flight, in flight, and/or shortly after flight begins, etc.). For example, in some instances, a pilot may take over at least partial control at least during a depositing of the product at the delivery location.

As described above, some embodiments utilize distribution vehicles 118. One or more UAS 104 and packages to be delivered can be loaded into the launch vehicles. Based on scheduled deliveries, the launch vehicles can be routed to predetermined launch locations that are within a predefined flight distance (e.g., based on battery power, weight of the package being delivered, weather conditions, etc.) of one or more scheduled delivery locations. In some instances, the task control system specifies distribution vehicle scheduling, routing and the like. The one or more UASs, which may be cooperated with one or more of the packages to be delivered, can be launched from a distribution vehicle. A distribution vehicle 118 can travel to multiple different launch locations to implement multiple different scheduled deliveries. Further, after launch, a distribution vehicle may proceed to a subsequent launch location to launch one or more other UASs and then subsequently return to a first launch location to retrieve one or more previously launched UASs.

The system uses at least sensor data captured by one or more sensors of a UAS while in flight (e.g., video content, wireless communication receiver or transceiver, beacon detector, etc.) to detect geographic no fly zones. For example, many no fly zones may be bounded to define a three dimensional space at and above a property. UASs should be inhibited from flying into these no fly zones. Again, some no fly zones may be defined by a governmental agency, while other no fly zones may be defined or established by one or more entities. These no fly zones defined by entities may have no legal restriction, but may be defined as a courtesy to the entity specifying zone. For example, a person may not want UASs flying over their home (e.g., because their dog adversely reacts), and as such may try to define or establish a no fly zone. When a no fly zone is accurately detected, the UAS control system can attempt to limit or prevent a UAS from traveling into or through the no fly zone. The detection of the no fly zone may be based on one or more factors. For example, an entity may set up and power one or more wireless no fly zone beacons or other wireless signal generators that transmit signals that can be detected and can be recognized as from a no fly zone beacon. As another example, a person may position a flag outside their home or business, place a marker or pattern on their roof, or other such visually detectable no fly zone marker. Based on the type of no fly zone marker, the UAS control system through image and/or video processing may detect the no fly zone marker and determine a corresponding size and/or boundaries of the entity defined no fly zone based on the type, number and/or location of the no fly zone markers. Many of these entity defined no fly zones may not be known to a retail entity and/or delivery service operating the UASs. Accordingly, these no fly zones are detected through sensor data of a UAS captured while the UAS is in flight.

Similarly, in some instances, the UAS control system may specify a geographic area as a temporary no fly zone. For example, a temporary no fly zone may be defined based on a UAS detecting one or more signals from emergency response agency vehicles (e.g., fire department vehicles, police department vehicles, ambulance vehicles, etc.), detecting a group or crowd of people having an estimated threshold number of people, aerial congestion of greater than a threshold, other such temporary no fly zone indicators, or combination of two or more of such indicators. Such signals may be activated by emergency response personnel, activated based on a vehicle responding to a notification, activated by a remote activation system (e.g., based on the system having knowledge that a particular vehicle is at or in route to an emergency situation). In some instances, radio communications from emergency vehicles and/or personal can be detected as used to identify a temporary no fly zone. Other temporary no fly zones may be identified based on other factors.

In some embodiments, a control circuit (e.g., the task system control circuit 202, the UAS control circuit 302, etc.) detects a no fly zone into which a UAS is to avoid flying. In some implementations, the no fly zone is detected while the UAS is in flight and traveling along a flight path to a delivery location where the UAS is scheduled to deliver a package. For example, the control circuit may receive sensor data from the UAS while the UAS is in flight, and based on the sensor data determine that the UAS is approaching or within a threshold distance of a no fly zone. Based on and/or in response to the detection of the no fly zone, a revised flight path to the delivery location is obtained. Typically, the revised flight path includes a detour route around the no fly zone. The motor controller 308 can be directed to control the motors to implement the revised flight path. In implementing the revised flight path, the UAS typically travels along the detour route and avoids the detected no fly zone. In some embodiments, the control circuit detects when the UAS is at a threshold distance from a delivery location and initiates delivery of a package.

An entity may attempt to establish a no fly zone through one or more methods. As introduced above, in some instances, the entity may place one or more no fly zone beacons or other such broadcasting devices that can broadcast one or more predefined signals that can be detected, one or more no fly zone markers can be placed on or around a geographic area (e.g., property, building, construction site, emergency response site (e.g., on the tops of emergency response vehicles, encoded light emitted from an emergency vehicle, or the like), other such markers, or combination of two or more of such markers). In some embodiments, for example, a beacon detector of the UAS can be coupled with the UAS control circuit 302 and/or in communication with the task system control circuit 202. The beacon detector can be configured to detect a wireless beacon signal indicative of the no fly zone and communicate a detection of a beacon signal to the UAS control circuit and/or the task system control circuit.

In some embodiments, the control circuit, in obtaining the revised flight path, determines the detour route based on a type of beacon signal detected by the beacon detector. In other implementations, the UAS may include a camera 312 that captures video and/or images that can be processed by the UAS control circuit, the task system control circuit, a separate image processor, or the like. Based on the image processing of the images captured by the camera, the control circuit, in detecting the no fly zone (e.g., detecting a predefined pattern, a predefined shape or combination of shapes, one or more predefined logos, predefined sequence of colors, and/or other such markers. The control circuit, in obtaining the revised flight path, can determine the detour route based on the detected visual indicator of the no fly zone. Again, The UAS may include a beacon detector that detects wireless beacon signals indicative of a no fly zone. The beacon detector communicates a detection of a beacon signal to the UAS control circuit and/or the task system control circuit. In some implementations, the control circuit, in detecting the no fly zone, is further configured to determine, in response to a detection by the beacon detector of a beacon from a beacon generator, at least a portion of a boundary of the no fly zone based on an estimated location of the beacon generator. The location of the beacon generator can be estimated based on one or more factors such as, but not limited to, signal strength, number of beacon signals detected, directional information corresponding to the beacon signal, information encoded in the beacon signal, type of beacon signal, other such factors, or a combination of two or more of such factors. For example, in some embodiments the control circuit determines at least the portion of the boundary of a no fly zone based on a signal strength of the beacon signal and/or a change in signal strength as the UAS flies along the flight path and/or revised flight path. As a further example, a distance the UAS is from the beacon generator can be estimated based on a signal strength and/or the UAS may apply a predefined radius as the no fly zone (e.g., such no fly zone beacons may have a predefined limited broadcast signal strength, and upon detecting the beacon the UAS can estimate a distance based on the signal strength and/or the detection of the beacon signal, determine a type of no fly zone beacon (e.g., based on a type of signal, information encoded in the signal, etc.), and determine a size of the no fly zone and/or a distance from the beacon that the UAS is to maintain). Further, the UAS can be rerouted one or more times over a period of time based on changes to the signal strength, detection of one or more additional no fly zone beacon signals from other beacons, and/or a predefined radius or predefined distance that is assumed from the detected no fly zone.

Some embodiments determine one or more boundaries, corners, or the like of a no fly zone based on multiple beacon signals. The control circuit can communicate instructions to alter the direction of flight by the UAS away from the flight path in response to the detection by the beacon detector of a first beacon signal from the first beacon generator. Following the change of direction, a subsequent notification from the beacon detector may be received of a second beacon signal from a second beacon generator. In some implementations, the control circuit may determine at least a portion of a boundary of the no fly zone based on an estimated location of the first beacon generator and an estimated location of the second beacon generator. Additionally or alternatively, beacons may be placed at corners or at points where a boundary changes direction. The signal strength used by these beacon generators may be adjusted based on how close other beacons are to each other, a size of the no fly zone attempting to be established, a type of beacon, and the like. In some instances, a beacon generator may include one or more detectors and a beacon generator control circuit that can autonomously adjust beacon signal strength based on signal strengths of one or more types of other beacon signals detected, signal strength of one or more other beacon signals detected, information encoded in one or more beacon signals detected, other such factors, or combination of two or more of such factors.

Accordingly, the UAS control circuit and/or the task system control circuit can use detected no fly zone indicators (e.g., flags, mats, decals, other such visual indicators, wireless signals, etc.) and can reroute the UAS while in flight in attempts to comply with a requested no fly zone and/or governmentally defined no fly zone. The rerouting can include adjusting a direction of travel for a distance that may be predefined (e.g., avoid entering an "X" meters radius of where a visual no fly zone indicator is detected), a distance that is dependent on one or more no fly zone beacon signals detected, or other such modifications to flight path. Further, the change in direction is often dependent on a relative location of the no fly zone relative to the intended flight path. Accordingly, for example, when a no fly zone is detected the control circuit may determine a size and/or shape of the no fly zone and the position of the no fly zone relative to the intended flight path. In those instances where the control circuit identifies that the UAS in traveling along the intended flight path will not enter the no fly zone, no adjustments to the flight path are needed. Alternatively, the flight path can be revised with one or more detour routes so that the UAS complies with the detected no fly zone. Furthermore, some embodiments may record and/or map a detected no fly zone and/or estimated locations of beacons. This mapping can be subsequently utilized by the task control system in determining subsequent flight paths in that area. The mapped no fly zones may be temporary no fly zone (e.g., based on detected flight congestion, emergency response vehicles, etc.) or long term no fly zones.

Additionally, the task control system 102 in generating the flight path can take into considerations no fly zones that the task control system is already aware of. In some instances the task control system may receive a notification of one or more known no fly zones. For example, a user may record location and/or boundary information of known no fly zones, such as airports and other governmentally defined no fly zones (e.g., national, state, city, municipality, etc. defined no fly zones). Such no fly zones may include military bases, airports, schools, stadiums, some government buildings, and the like. Further, in some implementations, the task control system may access one or more databases of recorded and/or registered no fly zones. These databases may define locations and/or boundaries of no fly zones. Still further, some embodiments provide a registration service, a no fly zone registration circuit 120, and/or accesses a separate third party registration service, that allows individuals, companies and/or other entities to register a property, area, location, etc. as a desired no fly zone. Often, the task control system is not bound to maintain these no fly zones, but often for various reasons (e.g. public relations, customer satisfaction, etc.) the task control system may attempt to honor these registered no fly zones.

In some implementations, the no fly zone registration circuit 120 communicatively couples with the distributed communication network 106 and receives, from an identified user (who may be associated with an entity), a request to designate or define a geographic zone over a property as a no fly zone. The request typically includes and/or is accompanied by a property identification of the geographically bounded property (e.g., a person's yard and home, a building, a defined geographic area (e.g., longitude and latitude coordinates), global positioning coordinates, or the like). This information can be recorded in a database that is accessible to the task control system 102 to potentially be used in determining flight paths. The request may in some instances specify time periods during which the requesting user would like the no fly zone to apply. Some requesting users may request a 24-hour no fly zone, while other users may request limited times (e.g., morning and evening on weekdays, and 6:00 AM-8:00 PM on weekends when children are more likely to be playing outside).

In some embodiments, the no fly zone registration circuit 120 further authenticates the user as being authorized to specify the identified property as a no fly zone and registers the identified property as a no fly zone property in response to the authentication of the user. The authentication can be achieved through one or more methods. In some applications, the no fly zone registration circuit in authenticating the user accesses a customer database maintained by a retail entity. The customer database includes information of customers that registered with the retail entity. The no fly zone registration circuit can utilize information in the customer database to confirm that the customer database associates the user with the identified property. For example, a customer may be a frequent customer and obtains benefits (e.g., sales prices, promotions, etc.) by registering with a retail entity. The retail entity may further implement the UAS control system 100 and/or contract with a service that UAS control system 100 to deliver products ordered by customers. Accordingly, the customer database would have customer address information based on payment methods, delivery address information, and/or other such information. Using this database of customer information, the no fly zone registration circuit can authenticate that the customer is associated with an address, location, geographic boundary or the like.

In some embodiments, the no fly zone registration circuit may further authenticate the requesting user through public records. For example, the no fly zone registration circuit, in authenticating the user, may be further configured to additionally or alternatively access government records and confirm that the government records associates the user with the identified property. In some instances, the registration circuit may access publically available property information (e.g., property tax information, etc.), and/or be granted access to non-publically available information for authentication purposes. Additionally or alternatively, the no fly zone registration circuit may communicate with one or more third party services that access government records to confirm whether a requesting user is associated with the identified property. Some embodiments may present a requesting user with a series of questions in an attempt to confirm the user should be associated with the property and allowed to specify the property as no fly zone. Other methods of confirmation may additionally or alternatively be employed, such as but not limited to checking credit card information, contacting one or more neighbors, an Internet Protocol address of a computer, smart phone, tablet, or other user interface unit being used by the user, landline phone number, other such methods, or a combination of two or more of such methods.

The task control system can utilize the no fly zone registration information in determining flight paths, detour routes and/or revised flight paths. In some implementations, for example, the UAS routing circuit 210 is configured to receive a launch location and a destination location (e.g., a delivery location or other location where a task is to be performed). The UAS routing circuit can identify that an identified property that has been registered as a no fly zone property is located between the launch location and a destination location. Utilizing this information, the UAS routing control circuit can in some instances determine a flight path for a UAS between the launch location and the destination location that includes avoiding flying over the registered identified property. As described above, in some applications, a UAS in implementing the flight path may autonomously or in cooperation with the task control system detect a no fly zone that was not previously accounted for in the flight path, and can determine one or more actions to cause the UAS to reroute to avoid the detected no fly zone.

Figure 5:
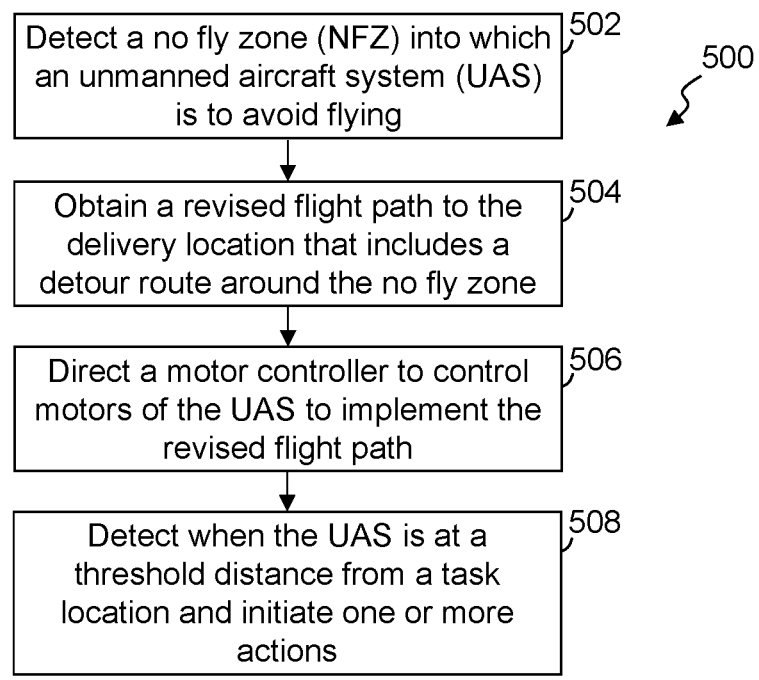
FIG. 5 illustrates a simplified flow diagram of an exemplary process of identify geographic zones into which UASs are inhibited from flying, in accordance with some embodiments.

FIG. 5 illustrates a simplified flow diagram of an exemplary process 500 of identify geographic zones into which UASs are inhibited from flying, in accordance with some embodiments. In step 502, a no fly zone into which the UAS is to avoid flying is detected based on sensor data captured by a sensor of the UAS while the UAS is in flight and traveling along a flight path to a task location (e.g., a delivery location where the UAS is scheduled to deliver a package). In step 504, a revised flight path is obtained to the delivery location that includes a detour route around the no fly zone. In some instances, the revised flight path is obtained in response to detecting the no fly zone and/or an indication of a no fly zone.

In step 506, the motor controller is directed to control the motors to implement the revised flight path. In some instances, the UAS control circuit 302 communicate instructions to the motor control circuit to control the direction of travel to fly along the revised flight path. Some embodiments include step 508 to detect when the UAS is at a threshold distance from a task location (e.g., a delivery location) and initiate one or more actions, such as initiating the delivery of a package. Further, some embodiments may detect, through a beacon detector of the UAS, a wireless beacon signal indicative of the no fly zone. In obtaining the revised flight path, some embodiments determine the detour route based on a type of beacon signal detected by the beacon detector.

In some implementations, a beacon detector of the UAS may detect a first beacon signal from a first beacon generator indicative of the no fly zone. The detection of a no fly zone can include determining, based on the detection by the beacon detector of the first beacon signal, at least a portion of a boundary of the no fly zone based on an estimated location of the beacon generator. Similarly, the boundary of a no fly zone may be detected based on multiple beacon signals. In implementing the revised flight path, some embodiments may alter the direction of flight by the UAS away from the flight path, which may be based on the detection by the beacon detector of the first beacon signal. A subsequent notification may be received from the beacon detector of a second beacon signal from a second beacon generator. In some instances, at least a portion of a boundary of the no fly zone may be determined based on the estimated location of the first beacon generator and an estimated location of the second beacon generator. Additionally or alternatively, some embodiments determine at least a portion of the boundary of a no fly zone based on a signal strength of the first beacon signal.

Some embodiments, in detecting a no fly zone, detect a visual indicator identifying a no fly zone. This visual indicator can be detected, in some applications, based on image processing of images captured by a camera on the UAS. The no fly zone can be identified based on detecting the visual indicator identifying the no fly zone. The detour route can be obtained and/or determined based on the detected visual indicator of the no fly zone.

In some embodiments, individuals and/or entities can register a property as a no fly zone. A property identifier can be received from over a distributed communication network and from an identified user. The property identification can identify a geographically bounded property. A request can be included and/or also received to designate a geographic zone over the identified property as a no fly zone. Some embodiments authenticate the user as being authorized to specify the identified property as a no fly zone. Based on the request, the identified property can be registered as a no fly zone property. The UAS routing system 210 can take into consideration one or more registered no fly zones. A launch location and a destination location can be received, and the UAS routing system can identify that the identified property registered as a no fly zone property is located between the launch location and a destination location. The flight path for the UAS between the launch location and the destination location can be determined that includes avoiding flying over the registered identified property.

Again, some embodiments authenticate the requesting user. In some implementations, the authentication can include accessing a customer database maintained by a retail entity of customers registered with the retail entity, and confirm that the customer database associates the user with the identified property. Additionally or alternatively, some embodiments access government records, and confirm that the government records associates the user with the identified property.

Some embodiments help with the regulation of no-fly zones. Consumers can use multiple outlets to decline the capabilities of UASs flying over specified properties. These no fly zones can extend to the borders of a geographical layout of a property with the use of public records and property zoning. In some implementations, the registration records are stored in memory accessible by the task control system 102. Some embodiments may further store other defined no fly zones, such as government defined no fly zones (e.g., FAA records), military bases, other government and/or municipality properties and/or buildings, and the like. Further, some embodiments verify properties being requested as no fly zones are not already defined as no fly zones or within no fly zones, but may also verify that the property is outside of an airport zone, a military base, and other no fly zone regulations or any other designated no-fly zones.

The registration of no fly zones and/or the recognition over time of other no fly zones detected by UASs while in flight (and/or by distribution and/or delivery vehicles) can enable entities that utilize UASs, such as a retail entity or delivery service that provides delivery service using UASs, to track no fly zones throughout neighborhoods and flight paths to delivery areas. Using the one or more databases of government defined no fly zone, registered no fly zone and/or determined no fly zone, that task control system can define flight paths and revised flight paths that avoid these no fly zones.

Some embodiments provide a user accessible application, such as a user interface on a web page, a software application (APP) on a user interface unit (e.g., smart phone, tablet, computer, etc.) that allows a user to request and/or register no fly zones. In some instances, the APP can utilize location information from the user interface unit to determine a location or property of the area being requested as a no fly zone. Validated request can be stored in a database (e.g., by the no fly zone registration circuit 120 and/or task control system 102 storing information in distributed memory). The task control system and/or no fly zone registration circuit can define or establish a virtual no fly "geo-fence" around an identified property or facility. The task control system in determining flight paths can reroute the UASs around the identified area (e.g., location of the web APP's GPS, IP address, street address, etc.). Further, some embodiments may detect beacon signals from no fly zone beacon generators. Consumers can buy one or more no fly zone beacon generators and set them up on the property. These beacon generators can wirelessly transmit no fly zone beacon signals (e.g., Bluetooth, Wi-Fi, cellular, LED lights, etc.) that can be detected by UASs. Upon detection, the UASs can be rerouted to maintain a threshold distance from an estimated location of the beacon generators and/or to avoid areas proximate the estimated location of the beacon generators. Other indicators can be used to designate an area as a no fly zone. For example, in some embodiments, sensor data from a UAS can be used to detect visual indicators of no fly zones, such as a raised flag, a color pattern, predefined text, a barcode (e.g., two dimensional bar code), that may be detected through image and/or video processing. The UASs and/or the task control system can detect the markers and reroute the UASs based on estimated no fly zone area corresponding to the one or more markers. In some embodiments, the location of the beacon generators, markers and/or a determined no fly zone can be saved and/or registered by the task control system and/or the no fly zone registration circuit. As such, the task control system can use the no fly zones in determining subsequent flight paths.

In some embodiments, systems, apparatuses and methods are provided to identify geographic zones into which unmanned aircraft systems (UAS) are inhibited from flying. Some embodiments comprise: a transceiver of an UAS; one or more motor controllers of the UAS coupled with motors that each drive a propeller to control flight of the UAS; a control circuit coupled with the transceiver; and a memory coupled to the control circuit and storing computer instructions that when executed by the control circuit cause the control circuit to perform the steps of: detect, while the UAS is in flight and traveling along a flight path to a delivery location where the UAS is scheduled to deliver a package, a no fly zone (NFZ) into which the UAS is to avoid flying; obtain a revised flight path to the delivery location that includes a detour route around the no fly zone; direct the motor controller to control the motors to implement the revised flight path; and detect when the UAS is at a threshold distance from the delivery location and initiate delivery of the package.

Some embodiments provide methods to identify geographic zones into which unmanned aircraft systems (UAS) are inhibited from flying, comprising: detecting, based on sensor data captured by a sensor of the UAS while the UAS is in flight and traveling along a flight path to a delivery location where the UAS is scheduled to deliver a package, a no fly zone (NFZ) into which the UAS is to avoid flying; obtaining a revised flight path to the delivery location that includes a detour route around the no fly zone; directing the motor controller to control the motors to implement the revised flight path; and detecting when the UAS is at a threshold distance from the delivery location and initiate delivery of the package.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to identify geographic zones into which unmanned aircraft systems (UAS) are inhibited from flying, comprising:
   a transceiver of an UAS;
   one or more motor controllers of the UAS coupled with motors that each drive a propeller to control flight of the UAS;
   a control circuit coupled with the transceiver; and
   a beacon detector of the UAS coupled with the control circuit and configured to detect wireless beacon signals indicative of the no fly zone and communicate a detection of a beacon signal to the control circuit;
   wherein the control circuit, in detecting the no fly zone, is further configured to determine, based on a detection by the beacon detector of a first beacon from a first beacon generator, at least a portion of a boundary of the no fly zone based on an estimated location of the first beacon generator; and
   wherein the control circuit, in detecting the no fly zone, is further configured to alter the direction of flight by the UAS away from the flight path based on the detection of the first beacon, receive a subsequent notification from the beacon detector of a second bacon signal from a second beacon generator, and determine at least the portion of the boundary of the no fly zone based on the estimated location of the first beacon generator and an estimated location of the second beacon generator; and
   a memory coupled to the control circuit and storing computer instructions that when executed by the control circuit cause the control circuit to perform the steps of:
   detect, while the UAS is in flight and traveling along a flight path to a delivery location where the UAS is scheduled to deliver a package, a no fly zone (NFZ) into which the UAS is to avoid flying;
   obtain a revised flight path to the delivery location that includes a detour route around the no fly zone;
   direct the motor controller to control the motors to implement the revised flight path; and
   detect when the UAS is at a threshold distance from the delivery location and initiate delivery of the package.

2. The system of claim 1,
   wherein the control circuit, in obtaining the revised flight path, determines the detour route based on a type of beacon signal detected by the beacon detector.

3. The system of claim 1, wherein the control circuit, in determining the at least the portion of the boundary of the no fly zone, determines the at least the portion of the boundary of the no fly zone based on a signal strength of the first beacon signal.

4. The system of claim 1, further comprising:
   a camera on the UAS;
   wherein the control circuit, in detecting the no fly zone, identifies the no fly zone based on a detection of a visual indicator identifying the no fly zone from image processing of images captured by the camera; and
   wherein the control circuit, in obtaining the revised flight path, determines the detour route based on the detected visual indicator of the no fly zone.

5. The system of claim 1, further comprising:
   a no fly zone registration circuit communicatively coupled with a distributed communication network, wherein the no fly zone registration circuit is configured to:
   receive, over the distributed communication network from an identified user, a property identification of a geographically bounded property and a request to designate a geographic zone over the identified property as a no fly zone;
   authenticate the user as being authorized to specify the identified property as a no fly zone; and
   register the identified property as a no fly zone property.

6. The system of claim 5, further comprising:
   a UAS routing system configured to:
   receive a launch location and a destination location;
   identify that the identified property registered as a no fly zone property is located between the launch location and a destination location; and
   determine a flight path for a UAS between the launch location and the destination location that includes avoiding flying over the registered identified property.

7. The system of claim 5, wherein the no fly zone registration circuit in authenticating the user is further configured to access a customer database maintained by a retail entity of customers registered with the retail entity, and confirm that the customer database associates the user with the identified property.

8. The system of claim 7, wherein the no fly zone registration circuit, in authenticating the user, is further configured to access government records and confirm that the government records associates the user with the identified property.

9. A method to identify geographic zones into which unmanned aircraft systems (UAS) are inhibited from flying, comprising:
   detecting, based on sensor data captured by a sensor of the UAS while the UAS is in flight and traveling along a flight path to a delivery location where the UAS is scheduled to deliver a package, a no fly zone (NFZ) into which the UAS is to avoid flying;
   detecting, through a beacon detector of the UAS, a first beacon signal from a first beacon generator indicative of the no fly zone;
   wherein the detecting the no fly zone further comprises determining, based on the detection by the beacon detector of the first beacon signal, at least a portion of a boundary of the no fly zone based on an estimated location of the first beacon generator; and
   wherein the implementing the revised flight path comprises: altering the direction of flight by the UAS away from the flight path; receiving a subsequent notification from the beacon detector of a second beacon signal from a second beacon generator; wherein the determining at least the portion of the boundary of the no fly zone comprises determining at least the portion of the boundary of the no fly zone based on the estimated location of the first beacon generator and an estimated location of the second beacon generator;

obtaining a revised flight path to the delivery location that includes a detour route around the no fly zone;

directing the motor controller to control the motors to implement the revised flight path; and detecting when the UAS is at a threshold distance from the delivery location and initiate delivery of the package.

10. The method of claim 9, wherein the obtaining the revised flight path comprises determining the detour route based on a type of beacon signal detected by the beacon detector.

11. The method of claim 9, wherein the determining the at least the portion of the boundary of the no fly zone comprises determining the at least the portion of the boundary of the no fly zone based on a signal strength of the first beacon signal.

12. The method of claim 9, wherein the detecting the no fly zone comprises detecting a visual indicator identifying the no fly zone based on image processing of images captured by a camera on the UAS;

identifying the no fly zone based on the detecting the visual indicator identifying the no fly zone; and wherein the obtaining the revised flight path comprises determining the detour route based on the detected visual indicator of the no fly zone.

13. The method of claim 9, further comprising:

receiving, from over a distributed communication network from an identified user, a property identification of a geographically bounded property and a request to designate a geographic zone over the identified property as a no fly zone;

authenticating the user as being authorized to specify the identified property as a no fly zone; and registering the identified property as a no fly zone property.

14. The method of claim 13, further comprising:

determining, through a UAS routing system, the flight path comprising:

receiving a launch location and a destination location;

identifying that the identified property registered as a no fly zone property is located between the launch location and a destination location; and determining the flight path for the UAS between the launch location and the destination location that includes avoiding flying over the registered identified property.

15. The method of claim 13, wherein the authenticating the user comprises accessing a customer database maintained by a retail entity of customers registered with the retail entity, and confirming that the customer database associates the user with the identified property.

16. The method of claim 15, wherein the authenticating the user comprises accessing government records, and confirming that the government records associates the user with the identified property.

* * * * *

UNITED STATES PATENT AND TRADEMARK OFFICE
CERTIFICATE OF CORRECTION

PATENT NO. : 10,269,255 B2
APPLICATION NO. : 15/460578
DATED : April 23, 2019
INVENTOR(S) : Donald R. High et al.

Page 1 of 1

It is certified that error appears in the above-identified patent and that said Letters Patent is hereby corrected as shown below:

In the Claims

Column 17, Line 40, Claim 1, delete "bacon" and insert --beacon--.

Signed and Sealed this
Twenty-seventh Day of August, 2019

Andrei Iancu
*Director of the United States Patent and Trademark Office*